US012732878B2

(12) United States Patent
Kondareddy

(10) Patent No.: US 12,732,878 B2
(45) Date of Patent: Sep. 8, 2026

(54) DEVICES, SYSTEMS AND METHODS FOR SELECTING COMMUNICATION PROTOCOL TRANSMISSION FREQUENCIES

(71) Applicant: Cypress Semiconductor Corporation, San Jose, CA (US)

(72) Inventor: Raghunatha Kondareddy, Fremont, CA (US)

(73) Assignee: Cypress Semiconductor Corporation, San Jose, CA (US)

(*) Notice: Subject to any disclaimer, the term of this patent is extended or adjusted under 35 U.S.C. 154(b) by 0 days.

(21) Appl. No.: 18/449,446

(22) Filed: Aug. 14, 2023

(65) Prior Publication Data

US 2024/0040453 A1 Feb. 1, 2024

Related U.S. Application Data

(63) Continuation of application No. 17/151,300, filed on Jan. 18, 2021, now Pat. No. 11,729,683, which is a continuation of application No. 16/217,356, filed on Dec. 12, 2018, now Pat. No. 10,897,730.

(60) Provisional application No. 62/741,341, filed on Oct. 4, 2018.

(51) Int. Cl.

| | |
|---|---|
| ***H04W 36/00*** | (2009.01) |
| ***H04L 69/18*** | (2022.01) |
| ***H04W 36/06*** | (2009.01) |
| ***H04W 36/26*** | (2009.01) |
| ***H04W 72/0453*** | (2023.01) |

(52) U.S. Cl.
CPC ............. *H04W 36/06* (2013.01); *H04L 69/18* (2013.01); *H04W 36/035* (2023.05); *H04W 36/26* (2013.01); *H04W 72/0453* (2013.01)

(58) Field of Classification Search
CPC ... H04W 36/03; H04W 36/06; H04W 36/165; H04W 36/26; H04W 72/0453; H04W 72/542; H04W 24/02; H04W 48/18; H04W 48/16; H04W 24/08; H04W 84/12; H04W 88/06; H04L 69/18; H04L 67/61
See application file for complete search history.

(56) References Cited

U.S. PATENT DOCUMENTS 9,307,416 B2 * 4/2016 Ruuska ................. H04W 24/00
9,826,529 B1 * 11/2017 Jorgovanovic .... H04W 72/0446
9,961,696 B2 * 5/2018 Wang ................ H04W 72/1215
10,897,730 B2 * 1/2021 Kondareddy ..... H04W 72/0453
11,452,110 B1 * 9/2022 Jorgovanovic .... H04W 72/1215
11,729,683 B2 * 8/2023 Kondareddy ......... H04W 48/16
370/331

(Continued)

*Primary Examiner* — John D Blanton

(57) ABSTRACT

A method can include, by operation of first communication circuits, determining a quality of a plurality of communication frequencies according to wireless communications of a first protocol type; recording a quality of the communication frequencies; selecting communication frequencies for use by second communication circuits based on the quality of the communication frequencies; and wirelessly transmitting and receiving data with the second communication circuits according to a second protocol different than the first protocol; wherein the first and second communication circuits are collocated on the same device. Related devices and systems are also disclosed.

17 Claims, 6 Drawing Sheets

(56) References Cited

U.S. PATENT DOCUMENTS

2002/0136268 A1* 9/2002 Gan .................... H04W 72/542 375/133
2006/0188004 A1* 8/2006 Kizu .................. H04W 72/542 375/132
2007/0275746 A1* 11/2007 Bitran ............... H04W 72/0446 455/552.1
2009/0258607 A1* 10/2009 Beninghaus ......... H04B 1/3805 455/77
2010/0097951 A1* 4/2010 Espina Perez ........ H04L 67/125 370/252
2010/0291921 A1* 11/2010 Ruuska ................. H04W 24/00 455/426.1
2012/0207032 A1* 8/2012 Chen ..................... H04W 28/04 370/252
2013/0121178 A1* 5/2013 Mainaud ................. H04L 43/08 370/252
2013/0169481 A1* 7/2013 Takatsuka ................ H01Q 3/34 342/372
2014/0023032 A1* 1/2014 Kim .................. H04W 74/0833 370/329
2014/0334396 A1* 11/2014 Lee ....................... H04L 5/0062 370/329
2014/0349594 A1* 11/2014 Hoshihara ............... H03F 3/189 455/77
2015/0208364 A1* 7/2015 Fukuhara ................ H04W 4/48 455/522
2015/0334523 A1* 11/2015 Lappetelainen ........ H04W 4/02 455/456.1
2016/0037544 A1* 2/2016 Wang ................ H04W 72/1215 370/329
2017/0134882 A1* 5/2017 Kao .................. H04W 72/1215
2018/0249506 A1* 8/2018 Amiri ............... H04W 74/0816
2018/0317227 A1* 11/2018 Aoyama ............... H04W 72/02
2019/0132873 A1* 5/2019 Patwardhan .......... H04W 8/005
2020/0112896 A1* 4/2020 Kondareddy ......... H04W 24/08
2020/0359161 A1* 11/2020 Jahn ...................... H04W 4/021
2021/0153028 A1* 5/2021 Li ......................... H04W 72/23
2021/0210442 A1* 7/2021 Dalmia ................. H10W 44/20
2021/0266925 A1* 8/2021 Aly ........................ G02B 27/01
2021/0329516 A1* 10/2021 Kondareddy ........... H04L 69/18
2023/0118771 A1* 4/2023 Kim .................. H04W 52/0216
2024/0040453 A1* 2/2024 Kondareddy ....... H04W 72/542

* cited by examiner

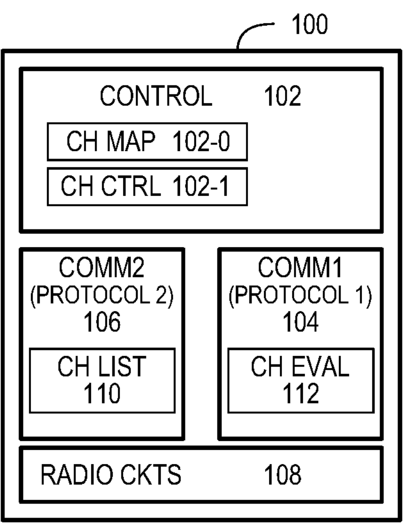
FIG. 1
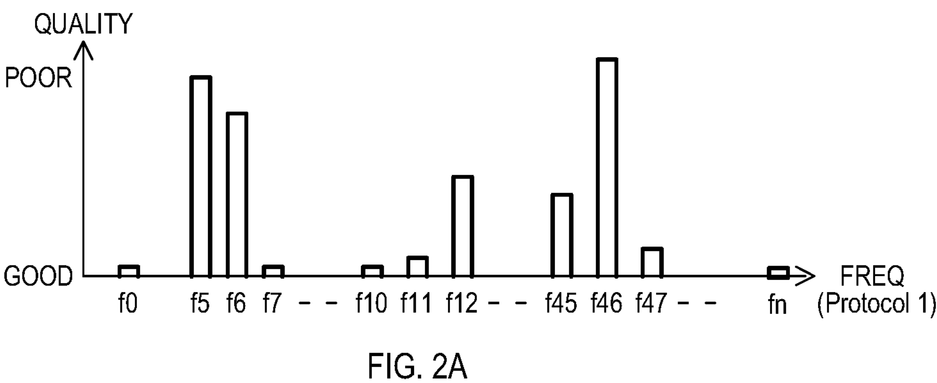
FIG. 2A
| CHANNEL (Protocol 2) | FREQ | USE |
|---|---|---|
| 1 | f0 | Yes |
| 2 | f6 | No |
| 3 | f11 | Yes |
| ¦ | ¦ | ¦ |
| 10 | f46 | No |
| ¦ | ¦ | ¦ |
FIG. 2B

1000C

1060D

1000D (BACKGROUND)

DEVICES, SYSTEMS AND METHODS FOR SELECTING COMMUNICATION PROTOCOL TRANSMISSION FREQUENCIES

CROSS-REFERENCE TO RELATED APPLICATION

This application is a Continuation of U.S. patent application Ser. No. 17/151,300, filed on Jan. 18, 2021, which is a Continuation of U.S. patent application Ser. No. 16/217,356, filed on Dec. 12, 2018, now U.S. Pat. No. 10,897,730, Issued Jan. 19, 2021, which claims the benefit of U.S. Provisional Patent Application No. 62/741,341, filed on Oct. 4, 2018, all of which are incorporated by reference herein in their entirety.

TECHNICAL FIELD

The present disclosure relates generally to wireless networks, and more particularly to wireless networks that include combination devices able to transmit according to two or more wireless communication protocols.

BACKGROUND

Conventional WLAN devices can operate over a range of different channels, each corresponding to particular frequencies. Conventional WLAN devices can select channels in a static fashion or a dynamic fashion. As available spectra are used by more devices and other protocols, particularly at the 2.4 GHz band, conventional WLANs can opt for dynamic channel selection in order identify the best channels to use for communication.

FIG. 11 is a flow diagram of a conventional WLAN dynamic channel selection method 1101. A WLAN device can select a channel (e.g., channels 1-11, ranging from about 2401 MHz to about 2473 MHz) (1101-1). In order to ascertain the quality of the channel, the WLAN device can dwell on the channel 1101-2 to acquire performance data. If a packet error rate of the channel is too high (HI from 1101-3), the channel can be avoided (1101-4). If a packet error rate of the channel is acceptable (LO from 1101-3), the channel can be marked as available (1101-5). A conventional WLAN device can cycle through remaining channels (1101-6), avoiding channels with high error rates and utilizing channels with lower error rates.

While dynamic channel selection can enable a conventional WLAN device to find reliable channels, the dwell time required to determine the quality of a channel can interrupt operations of the WLAN, decreasing throughput.

It would be desirable to arrive at some way of improving transmissions of a WLAN device, particularly those operating in crowded bands, such as the 2.4 GHz band.

BRIEF DESCRIPTION OF THE DRAWINGS

FIG. 1 is a block diagram of a combination device according to an embodiment.

FIGS. 2A and 2B are diagrams showing frequency evaluation and channel selection according to an embodiment.

DETAILED DESCRIPTION

Figure 3:
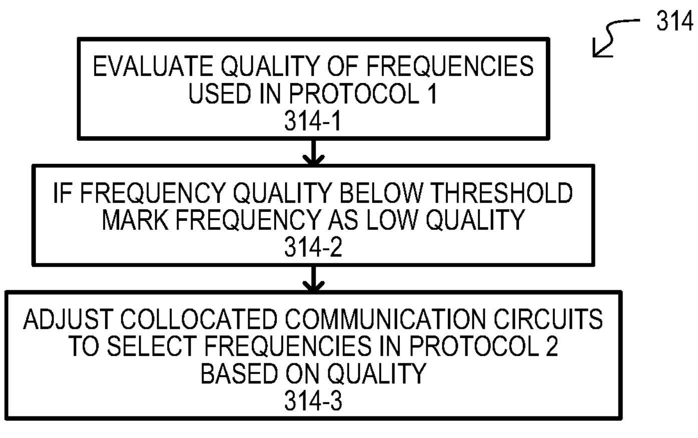
FIG. 3 is a flow diagram of a method according to an embodiment.

According to embodiments, combination devices and systems including such devices can communicate wirelessly according to two different protocols that can share transmission frequencies. A quality of transmission frequencies can be determined by communications of a first protocol type. When frequencies are to be selected for communications of a second protocol type, those frequencies determined to be of higher quality can be selected over those determined to be of lower quality by the first protocol type.

In some embodiments, a combination devices can be Bluetooth (BT)-WLAN combination devices that can communicate according to one or more BT standards and one or more IEEE 802.11 wireless standards. BT packet error rates for channels can be used by WLAN circuits to avoid higher error rate channels.

In the various embodiments below, like items are referred to by the same reference characters, but with the leading digit(s) corresponding to the figure number.

FIG. 1 is a block diagram of a combination device 100 according to an embodiment. A combination device 100 can include control circuits 102, first communication circuits 104, second communication circuits 106, and radio circuits 108. First communication circuits 104 can be wireless communication circuits compatible with a first protocol. First communication circuits 104 can include a channel evaluation section 112 that can evaluate communication channels used by the first communication circuits 104 when communicating according to the first protocol. In some embodiments, a channel can correspond to one frequency. However, in other embodiments, a channel can correspond to a range of frequencies. Further, a channel can modulate its corresponding frequency according to any suitable method, including frequency modulation as but one example.

Second communication circuits 106 can be wireless communication circuits compatible with a second protocol. Second communication circuits 106 can include a channel list 110. A channel list 110 can be a list of channels used in a second communication protocol. It is understood that channels of the second protocol are not necessarily the same as channels of the first protocol.

Control circuits 102 can alter channel list 110 according to evaluation results generate by evaluation section 112. Control circuits 102 can be configured to execute functions that include a channel map function 102-0 and a channel control function 102-1. A channel map function 102-0 can determine a quality of frequencies from channel evaluation data generated in first communication circuits 104 and map the quality of such channels/frequencies (as determine by first protocol communications) to channels used by second communication circuits 106. Channel control function 102-1 can select from channels from channel list 110 based on the quality of such channels. Thus, second communication circuits 106 need not perform a channel evaluation according to the second protocol as the channel has already been evaluated based on the first protocol.

Radio circuits 108 can transmit data according to the first and second protocol. In particular embodiments, radio circuits 108 can enable first and second communication circuits to share a common band (e.g., 2.4 GHz).

FIG. 2A is a diagram showing a first protocol channel/frequency evaluation that can be used in an embodiment. FIG. 2A shows a quality evaluation for a number of frequencies f0 to fn. In some embodiments, a channel can correspond to one frequency. However, in other embodiments, a channel can correspond to more than one frequency. It is understood that the quality evaluation is performed according to a first protocol. As shown, frequencies f0, f7, f10, f11 and f47 are of relatively high quality, while frequencies f5 and f46 are of relatively low quality.

FIG. 2B is a diagram showing a channel selection operation according to an embodiment. The channel selection operation can use frequency quality determinations to exclude channels for use in a second protocol. FIG. 2B shows channels of a second protocol and frequencies corresponding to such channels. As shown, Channel 1 of the second protocol utilizes frequency f0. Because frequency f0 has been determined to be of high quality, frequency f0 can remain available for selection for communications of the second protocol type. In contrast, Channel 10 of the second protocol utilizes frequency f46, which is of low quality. Consequently, Channel 10 can be excluded from use in communications of the second protocol type.

In some embodiments, channels of a second protocol can include a range of frequencies that are subdivided into a smaller ranges (e.g., sub-channels or resource units). According to embodiments, if a subdivision of the range is determined to include a low quality frequency, another subdivision of the same channel can be selected for use. As but one of many possible examples, the proposed IEEE 802.11 ax standard can include channels having ranges of 20 MHz that are dividable into sub-channels as small as 5 MHz or 2 MHz. If one of the sub-channels includes a low quality frequency as determined by another protocol (e.g., collocated BT circuits), the device can remove that sub-channel, using the remaining or other sub-channels.

FIG. 3 is a flow diagram showing a method 314 according to an embodiment. A method 314 can include evaluating a quality of frequencies used in a first protocol 314-1. In some embodiments, such an action can include first communication circuits of a combination device tracking when particular frequencies are used in transmissions according to a first protocol and recording error rates that occur at such frequencies. If the quality of a frequency falls below a threshold, the frequency can be determined to be of low quality 314-2. In some embodiments, this can include a combination device comparing an error rate for a frequency to some predetermined limits. Such predetermined limits can be static or dynamic, and can vary according to protocol or mode of operation.

A method 314 can include adjusting collocated communication circuits to select frequencies for communications according of a second protocol based on the quality of the frequencies 314-3. Such an action can include modifying a channel list maintained by communication circuits for selection of transmission frequencies.

Figure 4:
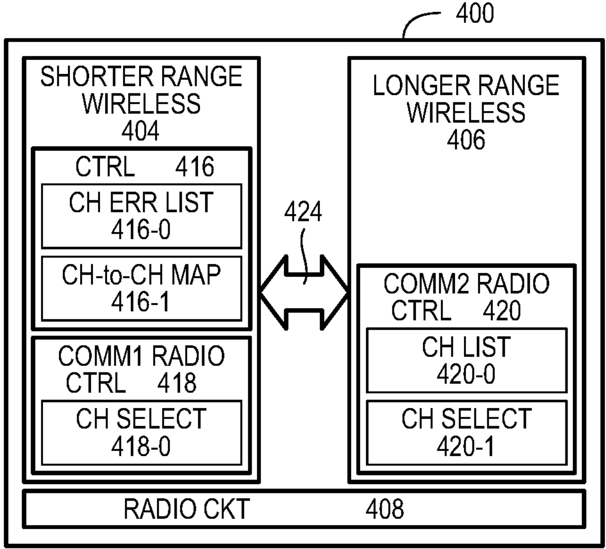
FIG. 4 is a block diagram of a combination device according to another embodiment.

FIG. 4 is a block diagram of a combination device 400 according to an embodiment. In some embodiments, a combination device 400 can be one of those shown as 100 in FIG. 1. A combination device 400 can include first communication circuits 404, second communication circuits 406, and radio circuits 408. First communication circuits 404 can be wireless communication circuits compatible with a first protocol that supports a first transmission range. First communication circuits 404 can include a control section 416 and first radio control circuits 418. Control section 416 can include a channel error list 416-0 and channel-to-channel map section 416-1. A channel error list 416-0 can record errors on channels used by first communication circuits 404 according to a first protocol. Channel-to-channel map section 416-1 can map channels of first protocol (used by first communication circuits 404) to channels of a second protocol (used by second communication circuits 406). First radio control circuit 418 can include a channel section 418-0, which can select channel to operate on according to the first protocol.

Second communication circuits 406 can be wireless communication circuits compatible with a second protocol that can support a second transmission range that is greater than the first transmission range. Second communication circuits 406 can include second radio control circuits 420. Second radio control circuits 420 can include a channel list 420-0 and channel select section 420-1. A channel list 420-0 can be a list of channels used by second communication circuits 406 for communications according to a second protocol. Channel select section 420-1 can select channels from the channel list 420-0 according to the second protocol.

According to embodiments, based on results from channel-to-channel map section 416-1, second protocol channels that map to low quality first protocol channels can be removed from channel list 420-0 (or skipped on the channel list) by control operations executed over bridge 424.

Radio circuits 408 can be used by first and second communication circuits 404 and 406 to transmit data according to the first and second protocol.

Figure 5:
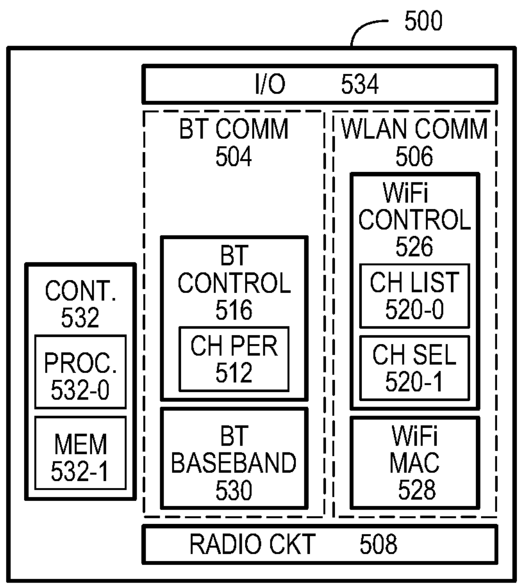
FIG. 5 is a block diagram of a combination Bluetooth (BT)-WLAN device according to an embodiment.

FIG. 5 is a block diagram of a combination device 500 according to another embodiment. In some embodiments, combination device 500 can be one particular implementation of combination device shown in FIG. 1 as 100. A combination device 500 can include first communication circuits 504, second communication circuits 506, controller 532, radio circuits 508, and input/output (I/O) circuits 534. First communication circuits 504 can be BT circuits including BT control circuits 516 and BT baseband circuits 530. BT circuits can operate in a 2.4 GHz band according to one or more BT protocols. BT control circuits 516 can control BT operations, including the formation and transmission of BT packets. BT control circuits 516 can include an error detection circuit 512, which can record a packet error rate (PER) for each channel utilized in BT communications.

Second communication circuits 506 can be WLAN circuits, including a WiFi control circuit 526 and WiFi media access control (MAC) circuits 528. WLAN circuits can operate in a 2.4 GHz and/or 5.0 GHz band. Second WiFi control circuit 526 can include a channel list 520-0 and channel selection section 520-1 for selecting channels for WLAN communications. In some embodiments, channel list 520-0 can include channels for use in the 2.4 GHz band which can use the same frequencies as channels used by BT communications.

Controller circuits 532 can control operations of a combination device 500, including matching low quality BT channels (from data generated by error detection circuit 512) to WLAN channels, and removing (or skipping) such matching WLAN channels from the channel list 520-0. In the embodiment shown, controller circuits 532 can include one or more processors 532-0 and a memory system 532-1.

Radio circuits 508 can take the form of any of those described herein or equivalents.

I/O circuits 534 can enable control of combination device 500 by another system or person external to the combination device 500. I/O circuits 534 can include circuits that enable communication with the combination device according to any suitable method, including any of various serial data communication standards/methods including but not limited to: serial digital interface (SDI), universal serial bus (USB), universal asynchronous receiver transmitter (UART), $I^2C$, or $I^2S$.

Figure 6:
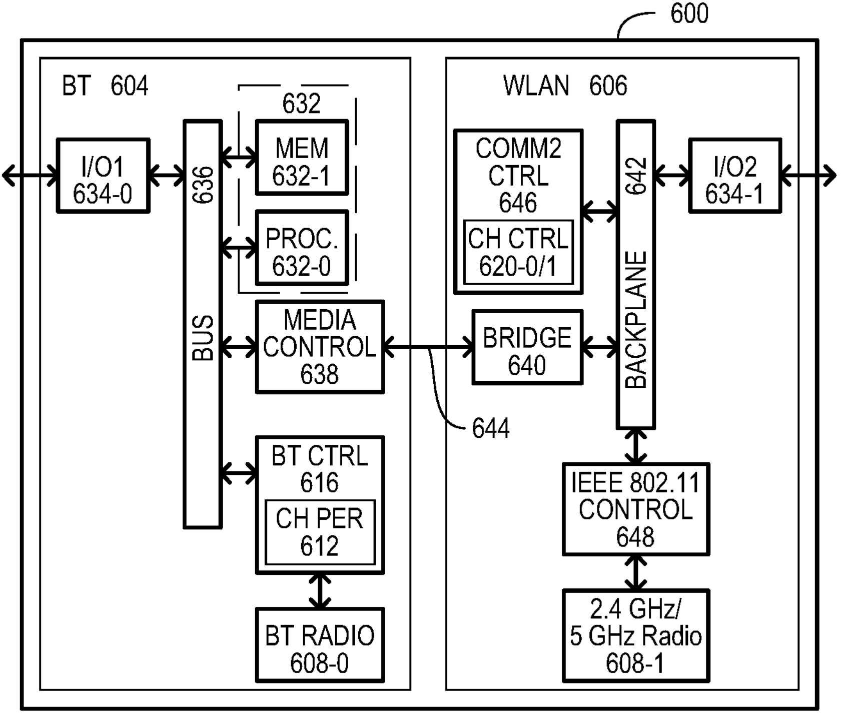
FIG. 6 is a block diagram of a combination Bluetooth BT-WLAN device according to another embodiment.

FIG. 6 is a block diagram of a combination device 600 according to another embodiment. In some embodiments, combination device 600 can be one particular implementation of either of those shown as 100 in FIG. 1. A combination device 600 can include a BT section 604 and a WLAN section 606. A BT section 604 can include a controller 632, BT control circuits 616, media control circuit 638, and first I/O circuits 634-0 in communication with one another over a bus 636. A controller 632 can control operations of combination device 600, including operations within WLAN section 606. In some embodiments, a controller 632 can issue control signals over bus 636 that can be transmitted to WLAN section 606 over bridge 644 via media control circuits 638. A controller 632 can include one or more processors 632-0 and a memory system 632-1. A controller 632 can determine lower quality WLAN channels from error data generated for BT channels, and adjust WLAN section 606 to avoid using such lower quality WLAN channels.

BT control circuits 616 can include circuits for performing functions according to one or more BT standards. BT control circuits 616 can include a packet error rate section 612, which can generate a PER for each BT channel. BT control circuits 616 can control BT radio 608-0 to operate according to one or more BT protocols.

Media control circuits 638 can communicate with WLAN section 606 over bridge 644 to coordinate communications between BT and WLAN sections (604, 606), including instructions that enable WLAN section to select higher quality WLAN channels over lower quality WLAN channels as determined by control section 632. First I/O circuits 634-0 can enable communication with the combination device 600 according to any of the embodiments described herein or equivalents.

A WLAN section 606 can include IEEE 802.11 control circuit 648, bridge control circuit 640, second communication control circuits 646, and second I/O circuits 634-1 in communication with one another over a backplane 642. IEEE 802.11 control circuits 648 can include circuits for performing functions according to any IEEE 802.11 wireless or equivalent standard. IEEE 802.11 control circuits 648 can be connected to dual band radio circuits 608-1. Dual band radio circuits 608-1 can transmit and receive data on a one or more WLAN bands (e.g., 2.4 GHz, 5 GHz).

Bridge control circuit 640 can control data transfer operations between BT section 604 and WLAN section 606 over bridge 644, including the transfer of control signals or instructions for indicating a quality WLAN channels used by WLAN section 606. Second I/O circuits 634-1 can enable communication with the combination device 600 according to any of the embodiments described herein or equivalents, including communications with BT section 604 over bridge 644. Second communication control circuit 646 can include channel control circuits 620-0/1 which can determine which channels are available for use by WLAN section 606 based on the quality of such channels.

Figures 7, 8:
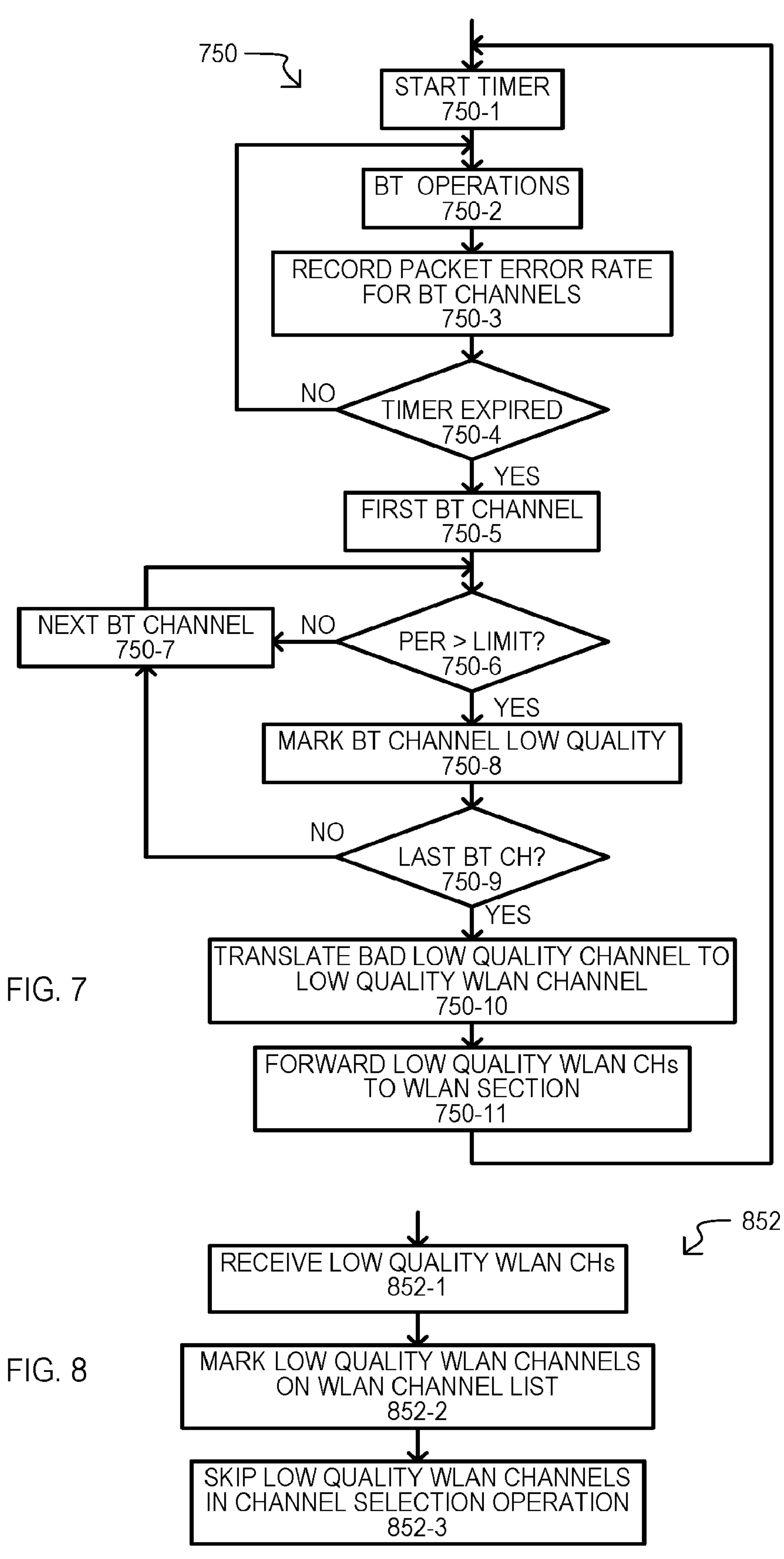
FIG. 7 is a flow diagram of a method according to an embodiment.
FIG. 8 is a flow diagram of a method according to another embodiment.

FIG. 7 is a flow diagram of method 750 for determining a quality of WLAN channels from an evaluation of BT channels according to an embodiment. A method 750 can include starting a timer 750-1. Such a timer can control the rate at which a WLAN channel list is updated to identify a quality of WLAN channels based on BT channel error data. BT operations can take place 750-2. As BT operations occur, packet error rates for BT channels can be recorded 750-3. Such actions can continue (NO from 750-4) until the timer expires.

When the timer expires (YES from 750-4) a method can evaluate an error rate of each BT channel. In the embodiment shown, this can include starting with a first BT channel 750-6. If the PER of the channel is not greater than a predetermined limit (NO from 750-6), a next BT channel can be selected for evaluation 750-7. If the PER of the channel is greater than a predetermined limit (YES from 750-6), the BT channel can be marked as low quality 750-8. Such actions can continue until a last BT channel is reached 750-9.

Once all BT channels have been evaluated (YES from 750-9), low quality BT channels can be translated to low quality WLAN channels 750-10. Such an action can include matching frequencies of low quality BT channels to those of WLAN channels. Low quality WLAN channels can then be forwarded to a WLAN portion of combination device 750-11.

FIG. 8 is a flow diagram of method 852 for selecting WLAN channels for WLAN communications according to an embodiment. A method 852 can include receiving information indicating low quality WLAN channels from a BT section 852-1. Low quality WLAN channels can be designated on a WLAN channel list 852-2. WLAN channels designated as low quality on the WLAN channel list can be skipped or otherwise not used in a WLAN channel selection operation 852-3.

Figures 9, 10A, 10B, 10C, 10D:
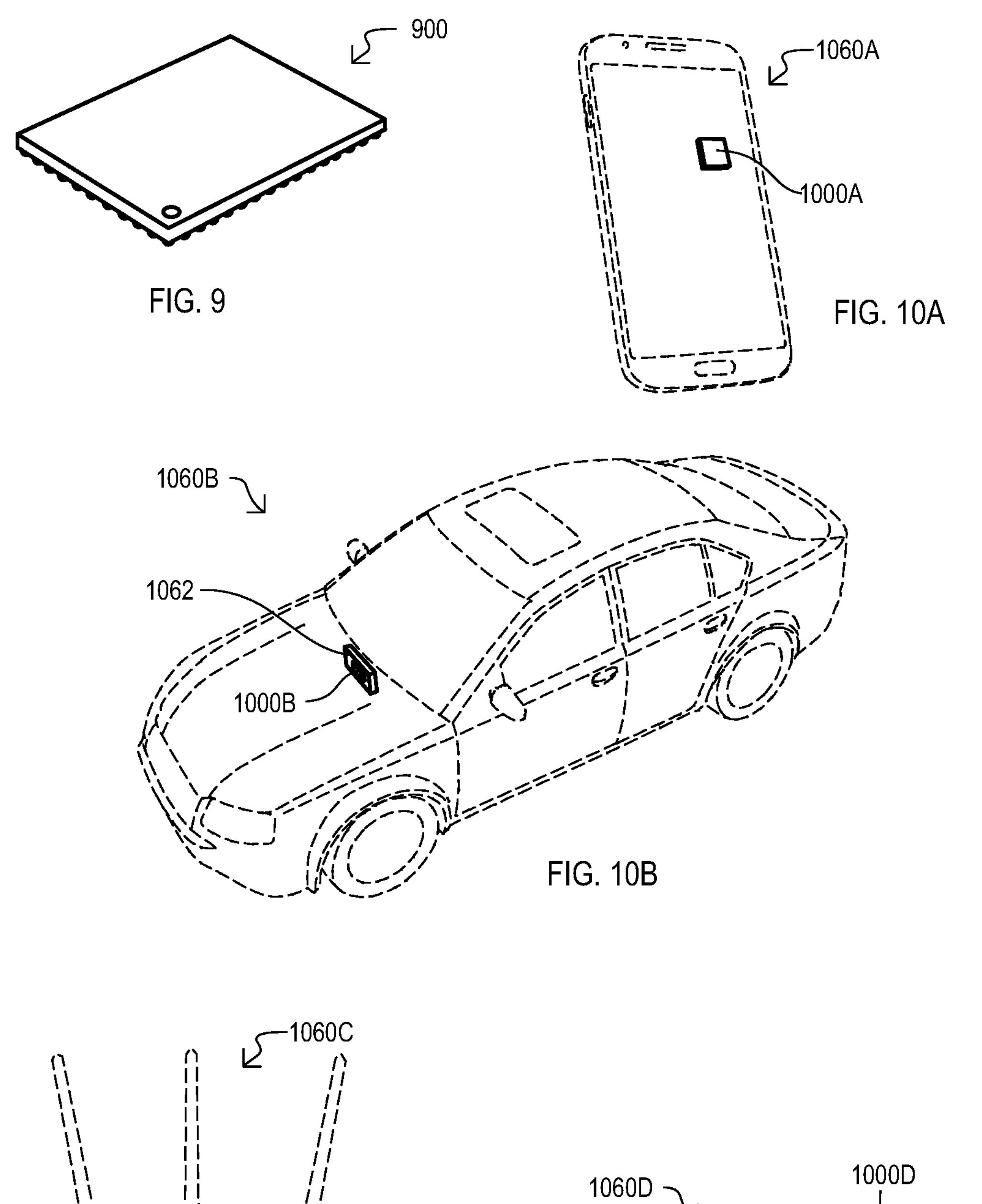
FIG. 9 is a diagram of a combination device according to an embodiment.
FIGS. 10A to 10D are diagrams of systems according to embodiments.
Figure 11:
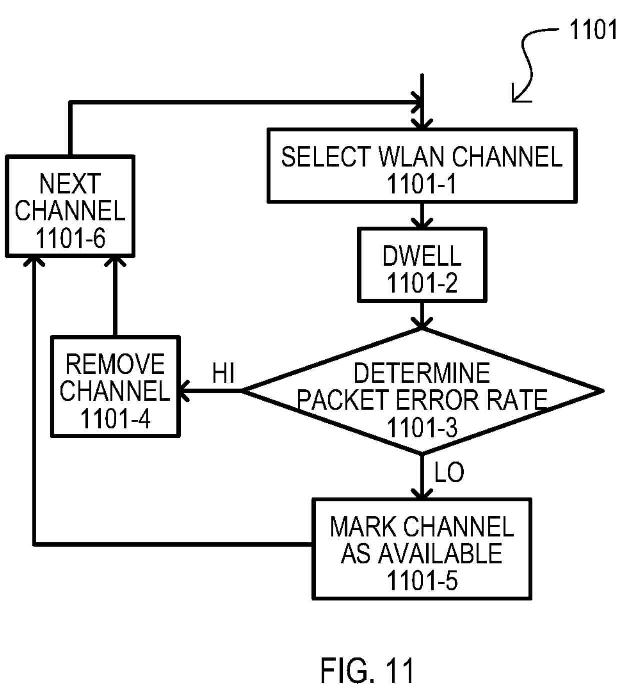
FIG. 11 is a flow diagram of a conventional WLAN dynamic frequency selection method.

While embodiments can include systems with various interconnected components, embodiments can include unitary devices which can selectively control the channels used in one protocol according to channel quality determinations made by operations of a different protocol. In some embodiments, such unitary devices can be advantageously compact single integrated circuits (i.e., chips). FIG. 9 show one particular example of a packaged single chip combination device 900. However, it is understood that a combination device according to embodiments can include any other suitable integrated circuit packaging type, as well as direct bonding of a combination device chip onto a circuit board or substrate.

Referring to FIGS. 10A to 10D, various systems according to embodiments are shown in series of diagrams. FIG. 10A shows a handheld computing device 1060A. Handheld computing device 1060A can include a combination device 1000A that can control transmission channels as described herein, or equivalents.

FIG. 10B shows an automobile 1060B that can have numerous sub-systems, including a communication subsystem 1062. In some embodiments, a communication system 1062 can enable an automobile to provide WiFi communications as well as enable other devices to pair to the system via Bluetooth. Communication system 10626 can include a combination device 1000B as described herein, or equivalents, serving as an access point, or part of an access point, to provide greater throughput for WiFi communications.

FIG. 10C shows a router device 1060C. Router device 1060C can provide routing functions for a relatively large range protocol (e.g., WLAN) while also enabling access via a closer range protocol (e.g., Bluetooth). Router device 1060C can include a combination device 1000C as described herein, or equivalents.

FIG. 10D shows a human interface device 1060D. Human interface device 1060D can enable a person to interact or control other devices. As but a few of many possible examples, human interface device 1060D can control a computing system, manufacturing equipment or other systems. Human interface device 1060D can include a combination device 1000D as described herein, or equivalents.

Embodiments described herein are in contrast to conventional systems in which may spend time dwelling on channels to determine whether such channels can be used in a communication protocol. According to embodiments, a combination device can use channel evaluation data for one protocol to avoid low quality channels in another protocol and thereby prevent dwelling and thus increasing data throughput of the network.

These and other advantages would be understood by those skilled in the art.

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of exemplary embodiments of the invention, various features of the invention are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claims require more features than are expressly recited in each claim. Rather, inventive aspects lie in less than all features of a single foregoing disclosed embodiment. Thus, the claims following the detailed description are hereby expressly incorporated into this detailed description, with each claim standing on its own as a separate embodiment of this invention.

What is claimed is:

1. A method, comprising:

by operation of first communication circuits, while executing communications across a plurality of first channels that are compatible with a first standard, determining a quality of each first channel according to the first standard, storing a quality value for each first channel, mapping at least first channels having a quality below a predetermined limit to sub-channels of second channels according to a second standard, marking one of the sub-channels that maps to at least one first channel having the quality below the predetermined limit as not preferred for use, and transmitting data from the first communication circuits that identifies the one sub-channel that is not preferred for use; wherein the first channels have a different frequency range than the second channels, and the second channels are divided into an even number of sub-channels, each having a same sub-channel frequency range.

2. The method of claim 1, wherein the first standard includes at least one Bluetooth standard.

3. The method of claim 1, wherein determining the quality of each first channel includes determining a packet error rate for each first channel.

4. The method of claim 1, wherein determining the quality of each first channel includes evaluating each first channel over a predetermined time period.

5. The method of claim 1, wherein the second standard includes at least one IEEE 802.11 wireless standard.

6. The method of claim 1, further including:

by operation of the first communication circuits, periodically determining the quality of each first channel, in response to at least one first channel having the quality below the predetermined limit, transmitting the data that identify at least the second channels that are not preferred for use.

7. A device, comprising:

first communication circuits compatible with at least a first wireless communication standard and including a channel evaluation section configured to evaluate a quality of first channels of the first wireless communication standard based on communications according to the first wireless communication standard;

control circuits configured to while executing communications according to the first wireless standard, determine and store a quality value for each first channel, map at least first channels having a quality below a predetermined limit to sub-channels of second channels of a second wireless communication standard, mark one of the sub-channels that maps to at least one first channel having the quality below the predetermined limit as not preferred for use, and communicate data that identifies the sub-channel that is marked as not preferred for use, wherein the first channels have a different frequency range than the second channels, and the second channels are divided into an even number of sub-channels, each having a same sub-channel frequency range.

8. The device of claim 7, wherein the first wireless communication standard is a Bluetooth standard.

9. The device of claim 7, wherein the second wireless communication standard is an IEEE 802.11 wireless standard.

10. The device of claim 9, wherein the second channels comprise different channels of the IEEE 802.11 wireless standard.

11. The device of claim 9, wherein the first communication circuits and control circuits are formed with a same integrated circuit substrate.

12. The device of claim 7, wherein:

the control circuits are further configured to, periodically determine the quality of each first channel, in response to at least one first channel having the quality below the predetermined limit, communicating the data that identify the sub-channel that is marked as not preferred for use.

13. A system, comprising:

at least a first device having first communication circuits configured to evaluate a quality of first wireless channels based on communications by the first communication circuits according to a first standard, control circuits configured to while executing communications according to the first standard, determine and store a quality value for each first wireless channel, map at least first wireless channels having a quality below a predetermined limit to sub-channels of second wireless channels of a second wireless standard, mark one of the sub-channels that maps to at least one first wireless channels having the quality below the predetermined limit as not preferred for use, and communicate data that identifies the one sub-channel that is marked not preferred for use; wherein the first wireless channels have a different frequency range than the second wireless channels, the second channels are divided into an even number of sub-channels, each having a same sub-channel frequency range, and the first and second standards indicate operations in a same band.

14. The system of claim 13, wherein the first device comprises an integrated circuit device with the first communication circuits and control circuits formed with a same substrate.

15. The system of claim 13, wherein the first standard is a Bluetooth standard.

16. The system of claim 13, further including:

second communication circuits configured to operate according to the second standard, and receive the data that identify at least the one sub-channel that is marked as not preferred for use.

17. The system of claim 13, wherein:

the control circuits are further configured to, periodically determine the quality of each first wireless channel, in response to at least one first wireless channel having the quality below the predetermined limit, communicating the data that identify the sub-channel that is marked as not preferred for use.

* * * * *